United States Patent [19]

Slocum et al.

[11] Patent Number: 4,765,668

[45] Date of Patent: Aug. 23, 1988

[54] ROBOT END EFFECTOR

[75] Inventors: Alexander H. Slocum, McLean, Va.; Peter A. Jurgens, Kirkland, Wash.

[73] Assignee: The United States of America as represented by the Secretary of Commerce, Washington, D.C.

[21] Appl. No.: 67,400

[22] Filed: Jun. 26, 1987

Related U.S. Application Data

[63] Continuation of Ser. No. 829,052, Feb. 13, 1986, abandoned.

[51] Int. Cl.⁴ ............................................. B25J 15/08
[52] U.S. Cl. ..................................... 294/88; 294/86.4; 294/119.1; 414/736; 901/37; 901/39
[58] Field of Search ................. 294/67.33, 81.62, 86.4, 294/86.41, 87.1, 88, 119.1, 902, 907; 269/32, 34, 152, 242, 244, 280, 281, 284; 414/729, 732, 736, 738, 741, 744 A, 751, 621; 901/30–39

[56] References Cited

U.S. PATENT DOCUMENTS

| | | | |
|---|---|---|---|
| 1,807,360 | 5/1931 | Wehr | 294/119.1 X |
| 3,245,562 | 4/1966 | Horton | 414/621 |
| 3,261,479 | 7/1966 | Baker et al. | 294/119.1 X |
| 4,336,926 | 6/1982 | Inagaki et al. | 294/119.1 X |
| 4,448,405 | 5/1984 | Cipolla | 294/119.1 X |
| 4,505,636 | 3/1985 | Sugino et al. | 294/86.4 x |
| 4,565,400 | 1/1986 | Nakashima et al. | 294/88 |
| 4,579,380 | 4/1986 | Zaremsky et al. | 294/119.1 |
| 4,591,199 | 5/1986 | Zajac | 294/88 |

FOREIGN PATENT DOCUMENTS

| | | | |
|---|---|---|---|
| 114096 | 7/1984 | European Pat. Off. | 294/86.4 |
| 2835447 | 2/1980 | Fed. Rep. of Germany | 901/38 |
| 138271 | 10/1979 | Japan | 294/119.1 |
| 47133 | 3/1984 | Japan | 901/36 |
| 891434 | 12/1981 | U.S.S.R. | 901/37 |

OTHER PUBLICATIONS

American Machinist, Jan., 1984, Color Photocopy of Cover.

Primary Examiner—Johnny D. Cherry
Attorney, Agent, or Firm—Thomas Zack; Alvin Englert; Harold L. Novick

[57] ABSTRACT

A double-handed, robot end effector or gripper which can be used for moving and positioning machine parts. The gripper is elongate and symmetric about its longitudinal axis, having a first and a second set of hands extending in each of the two transverse directions. Each hand has a removable finger and is positioned about an accurately repeatable midpoint. The hands are mounted on and are moved about the longitudinal plane by a ball screw which is rotated by either an electric motor or an air driven motor through gears located at one end.

20 Claims, 4 Drawing Sheets

ROBOT END EFFECTOR

This application is a continuation of application Ser. No. 829,052 filed Feb. 13, 1986, now abandoned.

FIELD OF THE INVENTION

The present invention relates to manipulating devices, and in particular relates to an end effector or gripper attachable to a robot for mechanically grasping and orienting objects.

BACKGROUND OF THE INVENTION

Robots can be used in a multitude of tasks, but generally they require end effectors which are designed for specific tasks. Normally, the design and fabrication of specialized end effectors has been the responsibility of the robot user. However, in order to increase the versatility of "off-the-shelf" grippers, more universal anthropomorphic designs are being developed.

One advanced design is a parallel jaw gripper which has as its main advantages simplicity in mechanical and electrical design and a desirable grip force-to-weight ratio. For example, force and position control can be obtained with a single actuator, one position sensor and one force sensor, and one microcomputer. Grip force-to-weight ratios on the order of 50:1 are easily obtainable as a result of the point of load application having no mechanical advantage over the linkage. Nevertheless, such grippers have several disadvantages, such as the inability of the gripper to reorient a part after it is grasped and the necessity of presenting an object to the gripper in a predetermined, known orientation. An additional disadvantage is the need for different types of hands for different parts and the requirement that the entire robot be disabled while lengthy adjustments in gripper hands are done.

Unfortunately, as with the robots themselves, there is usually no "best type" of design for a grasping system. It is important in any such design that the characteristics and movements of the overall system be considered. For example, in a precision flexible manufacturing work cell, finished parts having tolerances on the order of one-thousandth of an inch are usually stored in an orderly fashion to prevent the formation of burrs instead of merely being piled in a bin so human-like grasping abilities are not required. Other problems with respect to robots include payloads being quite limited in order to maximize the grip force-to-weight ratio and thus maximize a robot's potential to do useful work. When operating in a precision flexible manufacturing area, robot repeatability and accuracy must be high and reliable, but usually are not when compared to the precision parts and fixtures with which they operate. Consequently, methods are necessary to assist the robot during parts insertion processes and parts manipulation processes. On the other hand, those manipulators which have the flexibility and accuracy are usually extremely complex in both their mechanical and electrical systems, and consequently usually have a low grip force-to-weight ratio. As an example, a gripper currently being developed uses 38 pneumatic actuators controlled by 6 microprocessors that are coordinated by a minicomputer.

A manipulating device that utilizes a double threaded ball screw is disclosed in the U.S. Pat. No. 3,261,479 Baker et al. Such a device utilizes a stationary threaded screw which when turned, causes two bosses 19 and 20 to move together or apart so that grasping fingers 21 can engage an object 22.

A two finger manipulator for a robot is disclosed in the Inagaki et al U.S. Pat. No. 4,336,926. This patent discloses in column 1, lines 14–24 that it is old to use a motor driven screw rod with oppositely threaded portions to drive the robot fingers. Such a rod is also disclosed in a photograph of a precursor to the present invention on the cover of the January, 1984 edition of American Machinist.

Nevertheless, all of these prior art devices do not provide a highly versatile, mechanically and electrically simplistic robot end manipulator with the accuracies required in the machine tool manufacturing industry. Thus, there is need for an end effector or grasping system for use by robots which are operated in a machine tool environment. Such a gripper must not only have a high grip force-to-weight ratio, but should be thin, symmetrical, and manipulatable in a plurality of axes.

SUMMARY OF THE INVENTION

In view of the deficiencies of the prior art, the present invention was developed so as to provide a state-of-the-art gripper for use with robots that manipulate machine tools. The present invention can automatically change the grasping components of the end effector thereby providing increased versatility in the handling of a variety of part shapes and sizes while also having a high grip force-to-payload ratio.

Further design objectives of the present invention include a high grip force-to-payload ratio and the controlability of the grasping width and grasping force. Furthermore, in order to maintain repeatability and accuracy, the center of the gripping fingers moves an extremely small amount over the entire range of grip forces.

In a particular embodiment, the gripper frame has a configuration that makes it extremely narrow so as to permit the end effector to insert thin parts into collets. Furthermore, that embodiment is symmetrical about a central, longitudinal axis of the frame with hands and grasping fingers mounted on each side of the axis, the frame being rotatably mounted about that axis. As a result, two parts can be handled at once and a part removed from a collet can be turned over and then reinserted into the collet. This permits a machine tool being tended to cut metal while the robot removes a finished part and gets a new blank.

According to the present invention, a robot end effector or gripper comprises a manipulator having a frame and a left and right hand threaded ball screw mounted on the frame and rotatable by a motor. A pair of hands are threadingly engaged by the ball screw such that upon rotation of the tall screw in one direction the hands are moved relatively apart and upon rotation of the ball screw in the other direction, the hands are moved relatively toward one another. A pair of gripper fingers are removably mounted on the hands. In a particular embodiment of the present invention, the end effector is elongate and symmetrical about its longitudinal axis, the pair of hands being mounted on one side of the axis and a further pair of hands being mounted on a second ball screw located on the other side of the axis. In this embodiment, the frame has a generally rectangular shape in cross section and the fingers extend in the direction of the long or major axis of the rectangle.

DETAILED DESCRIPTION OF THE PREFERRED EMBODIMENTS

Figure 1:
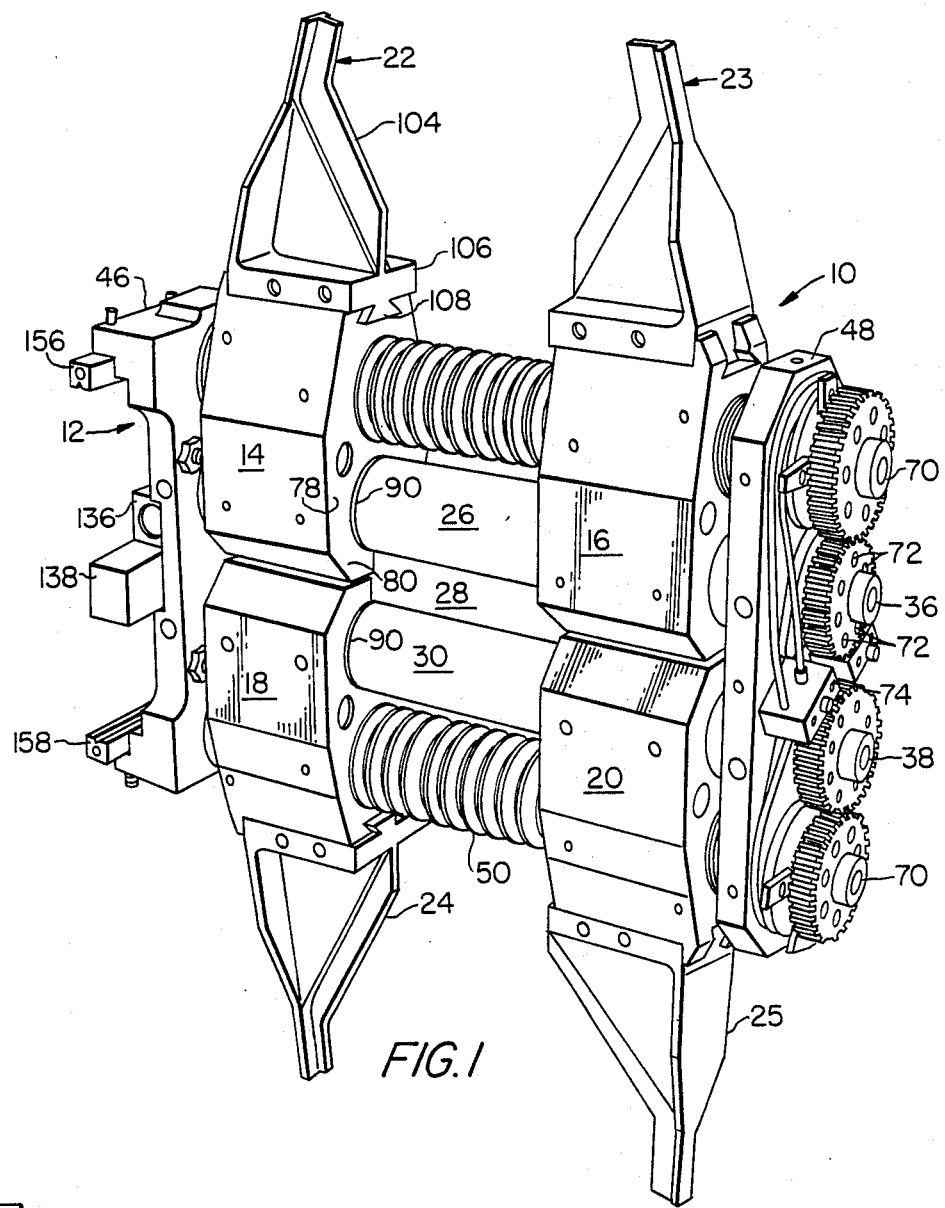
FIG. 1 is a perspective view of an actual model according to the present invention depicting the gear end of the end effector, and with some parts removed.

With reference now to the figures in which like numerals represent like elements throughout the several views, a robot end effector or gripper 10 mountable on the end of a robot arm is depicted. Gripper 10 is comprised of a symmetrical elongate frame 12 having a generally rectangular cross section (see FIG. 4), a first pair of hands 14 and 16 slidably mounted on and extending from the top side of frame 12 (as depicted in FIG. 1) and a second pair of hands 18 and 20 slidably mounted on and extending from the opposite, bottom side of frame 12 (as depicted in FIG. 1). Pairs of fingers 22 and 23 and 24 and 25, are slidably and removably mounted on hands 14, 16, 18 and 20 and extend outwardly therefrom.

Figure 2:
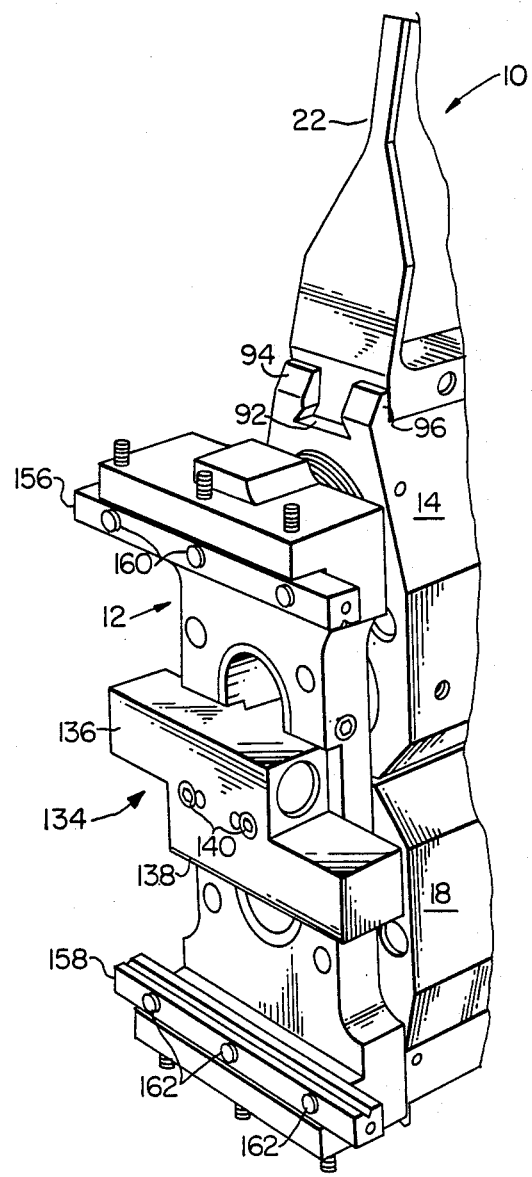
FIG. 2 is a perspective view from the other end of the end effector depicted in FIG. 1.
Figure 3:
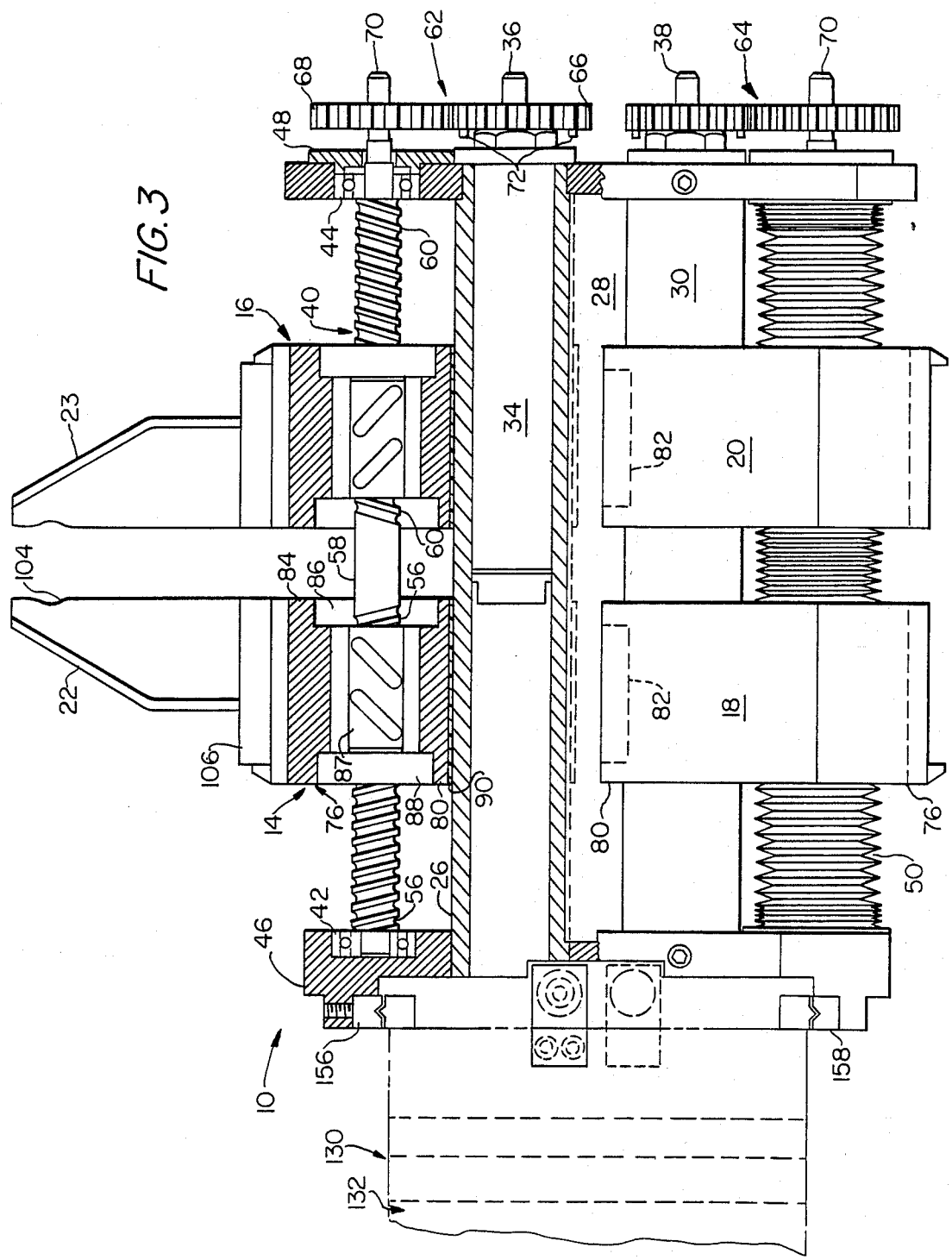
FIG. 3 is a side elevational view, partly in cross section, of the end effector depicted in FIG. 1.
Figure 4:
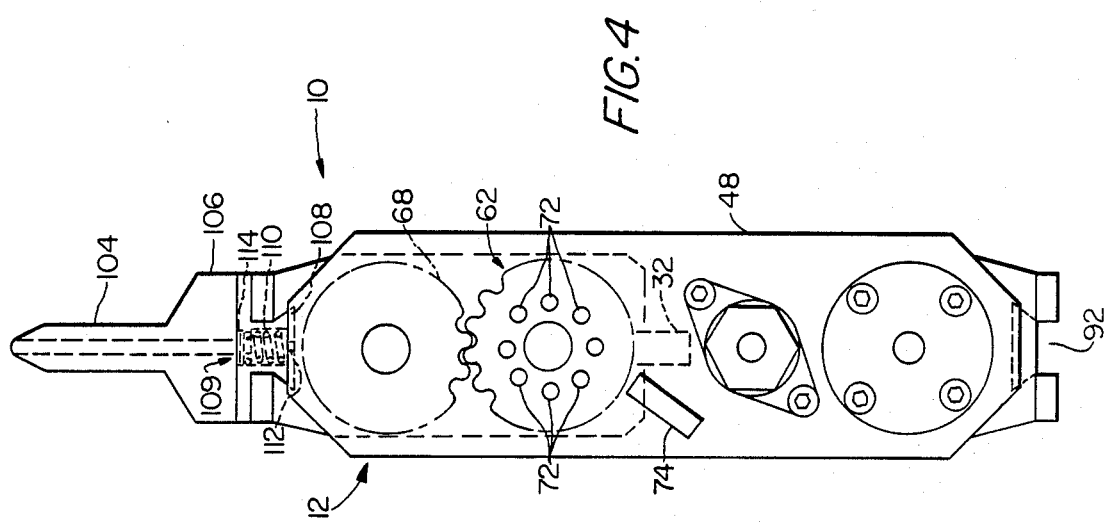
FIG. 4 is an end elevational view from the gear end of the end effector.

As shown in FIGS. 1, 2 and 4, frame 12 is an integral unit comprised of an upper (as depicted in the figures) hollow cylinder 26, a central web 28 and a lower hollow cylinder 30. Web 28 has a bore 32 therethrough so as to both lighten the web and to receive electrical wires or pipes. As shown in FIG. 3, an air motor 34 is mounted inside upper cylinder 26 and a corresponding air motor (not shown) is mounted inside lower cylinder 30. The air motors turn corresponding shafts 36 and 38.

The air motors 34 are essentially a rotary actuator and thus in other embodiments can also be an electric motor. An air motor has a higher power density and the capability of being run at a stall without damages. The disadvantages of an air motor include the difficulty in controlling the output torque and problems in correlating air pressure to torque output, which is a function of rotor position. On the other hand, an electric motor has the advantage of its easy controllability, but a disadvantage of burning out in a stall condition. If an electric motor is used, it is preferable that it be a brushless DC motor. On the other hand, an initial prototype used brushes and required a cooling air stream to prevent the motor from overheating. Nevertheless, by using current feedback and pulse width modulation, the gripper was able to hold a light bulb without crushing it, on the one hand, and could exert a compression force of over 600 pounds, on the other hand. If the particular application of the current invention can stand a coarser force resolution and a higher minimum gripping force, then the preferable motor would be an air motor. In an embodiment of the present invention, a 75 watt (0.1 horsepower), air motor having a stall torque of 10 N-m (90 in-lb) at 690 kpa (100 psi) and a maximum speed of 260 RPM was used.

As shown in FIG. 3, an upper ball screw 40 is rotatably mounted at each end in bearings 42 and 44. Bearings 42 and 44 are mounted on end plates 46 and 48, which in turn are rigidly mounted on opposite ends of frame 12 (see also FIGS. 4 and 5). A lower ball screw (not shown), located inside a flexible diaphragm 50, is rotatably mounted in bearings (not shown) similar to the mounting of ball screw 40. The ball screws are symmetrically mounted to end plates 46 and 48 about the longitudinal axis of frame 12. The ball screws can be identical and thus only upper ball screw 40 will be described. Ball screw 40 has a right hand threaded portion 56, a central unthreaded portion 58 and a left hand threaded portion 60. Hands 14 and 16, and 18 and 20 are symmetrically mounted on their respective ball screws about central portion 58. The linearity of the ball screw and the symmetrical mounting of the hands ensure that the gripping center-point of the fingers is repeatable and remains fixed with respect to gripper 10. In fact, because the ball screw is so highly efficient (up to 90%) it generates a back-driving torque that requires the driving motor to provide a continuous torque in order to maintain a high grip force on an object.

Ball screw 40 is rotated by air motor 34 through a gear train 62 and the lower ball screw (not shown) is rotated by a lower air motor (also not shown but located in lower cylinder 30, FIG. 3) by a lower gear train 64. Each gear train is similar and therefore only gear train 62 will be described. Gear train 62 is comprised of a relatively small spur gear 66 mounted on shaft 36 and a larger spur gear 68 mounted on a shaft 70 that is integral with ball screw 40 and extends through bearing 44. Both spur gears 66 and 68 are mounted spaced from end plate 48. Spur gear 66 has eight pegs 72 pressed into holes therein and which protrude toward end plate 48. An inductive proximity switch 74 (FIGS. 1 and 4) senses posts 72 as they go by and thereby provides an 8 count encoder. In a prototype of the present invention, motor spur gear 66 has a 35.6 mm (1.4 inch) diameter and ball screw spur gear 68 has a 48.3 mm (1.9 inch) diameter. The use of a spur gear train allows fine tuning of the desired mechanical gain because the gear pitch diameters can be changed. In a prototype of the present invention, in which ball screw 40 had a 5 mm (0.2 inch) lead left/right hand thread, the maximum gripping force was 2000 N (1555 lbs.), and the maximum travel along ball screw 40 was 43 mm/sec (1.7 in/sec).

Figure 6:
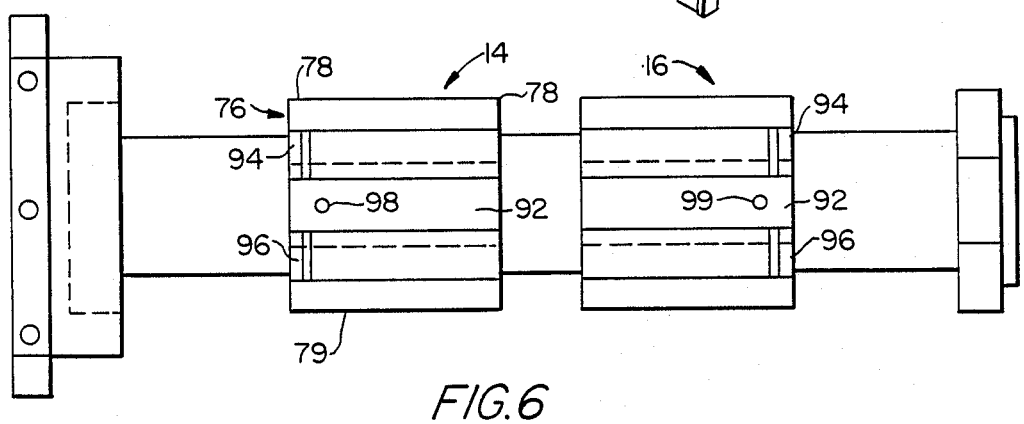
FIG. 6 is a top plan view of the end effector depicted in FIG. 3.

With reference now to FIGS. 1, 3 and 6, hands 14, 16, 18 and 20 will be described. Because the hands are substantially similar, only hand 14 will be described. Hand 14 is comprised of an upper (as depicted in FIG. 3) body portion 76 and two, integral, depending legs 78 and 79. Legs 78 and 79 are configured to fit around upper cylinder 26 and are slightly resilient so that they can be mounted thereon. Legs 78 have lower portions 80 which engage corresponding sides of frame web 28. Bearing pads 82 located on the inner sides of the leg lower portions 80 (depicted on hands 18 and 20 in FIG. 3) engage frame web 28 and prevent rotation of the hand while permitting longitudinal movement along frame web 28.

Hand 14 is also threadedly engaged by ball screw 40 and thus acts as a travelling nut upon the rotation of ball screw 40. In particular, hand body 76 is comprised of a hollow sleeve portion 84 having a bore 86 therethrough in which a ball nut 87 is mounted. Ball nut 87 has a flange 88 which transfers the closing force of nuts 87 to hand 14. Ball nut 87 may be mounted to hand body 76 by a press fit or set screws. Such mounting means prevent disengagement of ball nut 87 from hands 14, 16 when they are being opened. The inner surface of the lower part of hand body 76 has a coating of a bearing material 90, such as Teflon, on those portions which engage frame upper or lower cylinders 26 and 28.

As shown in FIGS. 2 and 6, the upper (as depicted in the figures) end of hand 14 and hand 16 have a dovetail-shaped channel 92 in the upper surface thereof. Two upstanding bosses 94 and 96, located on the outermost top portions (as seen in FIG. 6) of hands 14 and 16, are integral with the upper surface of hand body 76. Located along the center line of hands 14 and 16, toward bosses 94 and 96 are detent cavities 98 and 99, respectively.

As shown in FIGS. 1-4, slidably, removably mounted on hands 14 and 16 and hands 18 and 20 are fingers 22 and 23 and fingers 24 and 25, respectively. Each of the fingers are substantially similar and therefore only finger 22 will be described. Finger 22 has an outward grasping portion 104 integral with a base 106. As shown in FIG. 4, extending outwardly in the opposite direction from base 106 is a projecting tenon 108 having a dovetailed shape conforming to the shape of dovetail channel 92 in hand 16.

Fingers 22 and 23 can be easily and removably inserted into corresponding hands 14 and 16 by sliding them in the axial direction until the finger base 106 abuts bosses 94 and 96. Each finger furthermore has a spring loaded detent 109 (depicted in FIG. 4) comprised of a spring 110 and a plunger 112 located in an outwardly extending cavity 114 in tenon 108. Thus, when a finger is inserted into a hand, detent 109 is received by detent cavity 98 and thus the finger is removably retained on the hand and prevented from easily sliding back out. Because fingers 22 and 23 and 24 and 25 are designed to grasp an object by their inner surfaces, bosses 94 and 96 provide the necessary rigidity and permit the fingers to obtain the maximum designed grasping or compression forces. The triangular shape of the dovetail further acts to center and align the fingers when a grasping force is applied.

The ability to change fingers allows gripper 10 and the robot to which gripper 10 is attached to perform different tasks more economically than if the entire gripper or if the entire hand had to be changed. For example, when tending a turning center, a narrow set of fingers is used to allow short parts to be turned over, while a different set of fingers is used to change tooling. A third set of fingers is required to change collets. In a completely automated flexible manufacturing environment, if an odd shaped part is to be handled, a set of disposable fingers could be machined as needed, thereby reducing the fixturing inventories and their associated costs. The dovetail slot attachment means for the fingers allows them to be changed simply by first closing the fingers, moving the gripper 10 to insert the fingers into a stationary, auxiliary fixture (not shown) and then opening the hands. As the hands are opened, the fingers are held by the auxiliary fixture. Similarly, new fingers can be mounted on the hands by reversing these procedures.

Figure 5:
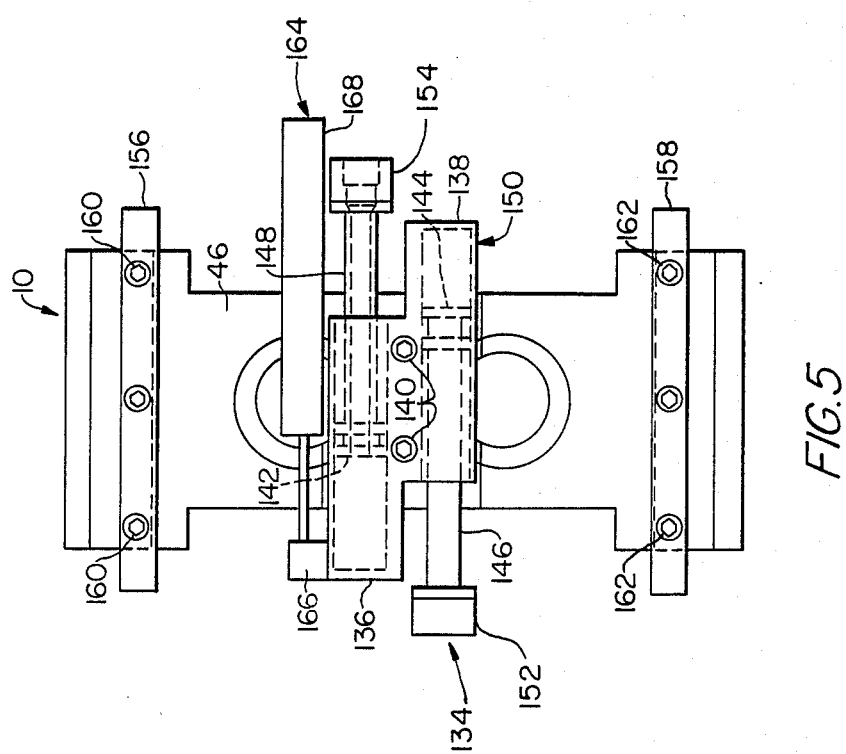
FIG. 5 is an elevational view from the other end of the end effector.

With reference now to FIGS. 2, 3 and 5, the end of gripper 10 which is connected to a robot will now be described. For the purposes of illustration, the connector to the robot is shown only in general form at 130 in FIG. 3. Robot connector 130 connects between a robot generally shown at 132 and gripper 10. Robot connector 130 is comprised of a conventional rotational fitting for permitting gripper 10 to be rotated about its longitudinal axis with respect to robot 132. Thus, in addition to providing a supporting connection between gripper 10 and robot 132, robot connector 130 also provides the means for rotating gripper 10 and means for providing the appropriate electrical signals to and from gripper 10 and for providing the appropriate pneumatic connections (now shown) to motor 34. Alternatively, the pneumatic connections can be made directly with flexible hoses to motor 34, bypassing connector 130, and the rotation of connector 130 is simply limited to a predesigned angle.

As shown in FIGS. 2 and 5, robot connector 130 also includes a means for reciprocally moving frame 12 in a transverse direction as depicted in FIG. 2. This transverse movement is provided by a conventional piston and cylinder mechanism 134. Mechanism 134 is comprised of an upper cylinder 136 and a lower cylinder 138 (as seen in the figures) rigidly connected to end plate 46 with fasteners such as bolts 140. Upper and lower cylinders 136 and 138 respectively receive pistons 142 and 144 to which are attached piston tails 146 and 148. In the embodiment depicted in the figures, mechanism 134 is a double piston assembly having a unitary "S" shaped housing 150 in which both cylinders 136 and 138 are located. Two couplings 152 and 154 are respectively mounted on to the ends of piston tails 146 and 148, and in turn are rigidly connected to robot connector 130 (not shown). Thus, the movement of piston 142 or 144 inside its corresponding cylinder 136 or 138 results in the lateral movement of gripper 10.

The lateral movement of gripper 10 is stabilized by an upper bearing 156 and a lower bearing 158 (see FIG. 3), which can either be ball bearings or crossed roller bearings. The gripper halves of bearings 156 and 158, as shown in FIGS. 2 and 5, are rigidly mounted to end plate 46 with fasteners such as screws 160 and 162. The cooperating halves of bearings 156 and 158 (shown in FIG. 3) are rigidly mounted to robot connector 130. Position feedback is provided by a linear transducer 164, the piston part 166 of which is connected to housing 150 and the cylinder part 168 of which is rigidly connected to robot connector 130.

A gripper or end effector attachable to industrial robots has been described with respect to a preferred embodiment thereof. The present invention has the ability to change its own fingers and because of its narrow profile, is particularly well suited for removing a part from a fixture and immediately inserting another part, or rotating that part and inserting the other side thereof into a fixture. The versatility of the present invention allows it to handle a variety of part shapes and sizes and still has a very high grip force to payload ratio. By designing the gripper symmetrically, two parts can be handled at once which permits one to be removed from a fixture such as a collet, to be turned over by the rotation of the gripper connector, and then have the other side inserted into the collet. Then, the robot can take the removed part and drop it off and get a new blank while the inserted part is being worked on. The design of the hands and the ball screws provides a system repeatability that does not vary more than 0.05 mm (0.002 in.) over the entire range of grip forces. In addition, in a specific design of the present invention, a jaw opening (the distance between the fingers) can be typically 6 inches.

In the design of the presently preferred embodiment of the present invention, the hand and finger designs are based on a maximum stress criterion because the hand and finger deflections only create cosine errors in the repeatability of the grip point as the grip force is increased. The frame design is based primarily on a maximum deflection criteria because the translation of the beam directly affects the grip point repeatability. In order to achieve the low weight feature of the present invention, all structural members are preferably made from a light weight material, such as 2024-T6 aluminum.

The present invention has been described with respect to a preferred embodiment thereof. Obviously, modifications and changes can be mae thereto within the abilities of those skilled in the art without affecting the scope of the invention.

We claim:

1. A robot end effector or gripper comprising:
 a manipulator having an elongate frame that defines a longitudinal frame axis;
 a motor mounted on said frame;
 a ball screw rotatably mounted on said frame generally parallel to said longitudinal frame axis, said screw being rotatable by said motor and having a mid portion, a left hand threaded portion on one side of said mid portion, and a right hand threaded portion on the other side of said mid portion;
 a pair of hands slidingly mounted on said frame for reciprocal movement in said longitudinal frame axis, each hand having inner sides facing the other hand and opposed outer sides, one hand threadedly engaged by said screw left hand portion and the other hand threadedly engaged by said screw right hand portion, and both hands being slidingly mounted on said frame such that upon rotation of said ball screw in one direction said hands are moved relatively apart and upon rotation of said ball screw in the other direction said hands are moved relatively together, all such movement being substantially symmetrical to said screw mid portion;
 a pair of fingers used to grasp an object;
 and means for removably mounting each said finger on a corresponding one of said hands such that said fingers can be automatically mounted and dismounted on said hands.

2. The robot end effector or gripper as claimed in claim 1
 wherein said frame has a generally rectangular cross-section with a long and a short axis, and said frame is symmetrical about said longitudinal axis; and
 wherein said hands extend in the direction of the long transverse axis of said frame and are movable in a direction generally parallel to said longitudinal axis.

3. The robot end effector or gripper as claimed in claim 1 and further including a second ball screw rotatably mounted on said frame, and having a left hand threaded portion and a right hand threaded portion;
 a second pair of hands, one threadedly engaged by said second screw left hand portion, and the other threadedly engaged by said second screw right hand portion; and
 a second pair of fingers removably mounted on said second pair of hands.

4. The robot end effector or gripper as claimed in claim 1 wherein said frame comprises an upper cylinder and a lower cylinder mounted integrally on either side of a central web.

5. The robot end effector or gripper as claimed in claim 4 wherein said web has a longitudinal bore therethrough.

6. The robot end effector or gripper as claimed in claim 4 wherein said motor is mounted inside one of said upper and lower cylinders.

7. The robot end effector or gripper as claimed in claim 6 wherein said motor has a shaft that extends outside said cylinder;
 and further including a gear train connected between said motor shaft and an end of said ball screw.

8. The robot end effector or gripper as claimed in claim 7 wherein said gear train comprises a first spur gear mounted on said motor shaft, and a second spur gear meshing with said first spur gear and mounted on said ball screw end, and further including first means mounted to one of said spur gears and second means mounted on said frame for jointly providing a signal indicative of the rotation of said one spur gear.

9. The robot end effector or gripper as claimed in claim 1 and further including:
 a shaft driven by said motor; and
 a gear train connected between said shaft and an end of said ball screw.

10. The robot end effector or gripper as claimed in claim 9 wherein said gear train comprises a first spur gear mounted on said shaft and a second spur gear in meshing engagement with said first spur gear and mounted on said ball screw end.

11. A robot end effector or gripper comprising:
 a manipulator having an elongate frame that defines a longitudinal frame axis;
 a motor mounted on said frame;
 a ball screw rotatable mounted on said frame generally parallel to said longitudinal frame axis, said screw being rotatable by said motor and having a mid portion, a left hand threaded portion on one side of said mid portion, and a right hand threaded portion on the other side of said mid portion;
 a pair of hands slidingly mounted on said frame for reciprocal movement in said longitudinal frame axis, one hand threadedly engaged by said screw left hand portion and the other hand threadedly engaged by said screw right hand portion and both hands being spaced equally from said screw mid portion and slidingly mounted on said frame such that upon rotation of said ball screw in one direction said hands are moved relatively apart and upon rotation of said ball screw in the other direction said hands are moved relatively together, all such movement being substantially symmetrical to said screw mid portion;
 a pair of fingers removably mounted on said pair of hands;
 a shaft driven by said motor;
 a gear train connected between said shaft and an end of said ball screw, said gear train comprising a first spur gear mounted on said shaft and a second spur gear in meshing engagement with said first spur gear mounted on said ball screw end; and
 first means mounted in one of said spur gears and second means mounted on said frame for jointly providing a signal indicative of the rotation of said one spur gear.

12. The robot end effector or gripper as claimed is claim 1 wherein said motor is a pneumatically driven motor.

13. The robot end effector or gripper as claimed in claim 1 wherein each of said hands are engaged by said screw at one portion thereof and extend outwardly from said frame in the transverse direction; and further including means for slidably mounting each said finger on its corresponding one of said hands, said mounting means comprising a stop located at the outward end of said hand, a rail mounted on one of said finger and said hand, and a channel mounted on the other of said finger and said hand such that said finger can be slidable out of engagement with said hand only in an inward direction.

14. The robot end effector or gripper as claimed in claim 13 wherein said rail and channel have a dovetail shape.

15. The robot end effector or gripper as claimed in claim 13 wherein said mounting means further comprises a releasably engageable catch to releasably retain said finger mounted on said hand.

16. The robot end effector or gripper as claimed in claim 1 and further including means for reciprocally moving said frame in a transverse direction.

17. The robot end effector or gripper as claimed in claim 1 and further including means for mounting said frame for at least partial rotation about the longitudinal axis thereof.

18. A robot end effector or gripper comprising:
a manipulator having an elongate frame that defines a longitudinal frame axis and comprising an elongate web, an upper cylinder and a lower cylinder mounted integrally on either side of said web;
a pair of hands slidingly mounted on said frame about one of said cylinders and a portion of which slidingly engages said web for reciprocal movement in said longitudinal frame axis; and
means for selectively, reciprocally sliding said pair of hands on said frame such that said hands are moved relatively apart and are moved relatively together.

19. A robot end effector or gripper as claimed in claim 18 wherein said sliding means comprises a motor mounted in one of said cylinders, a rotatable elongated screw mounted on the side of one of said cylinders opposite said web such that said screw, said cylinders and said web are coplanar, and means for operatively connecting said motor to said hands.

20. A robot end effector or gripper as claimed in claim 19, and further comprising
a further pair of hands slidingly mounted on said frame for reciprocal movement in said longitudinal frame axis; and
further means for selectively, reciprocally sliding said further pair of hands on said frame such that said hands are moved relatively apart and are moved relatively together, said further sliding means comprising a further motor mounted in the other one of said cylinders, and further means for operatively connecting said further motor to said further hands; said hands and said further hands being mounted on opposite transverse sides of said frame.

* * * * *